(12) United States Patent
Pedley et al.

(10) Patent No.: US 10,070,120 B2
(45) Date of Patent: Sep. 4, 2018

(54) OPTICAL SEE-THROUGH DISPLAY CALIBRATION

(71) Applicant: QUALCOMM Incorporated, San Diego, CA (US)

(72) Inventors: Christopher Pedley, Cambridge (GB); Daniele Masato, Cambridge (GB); Andrew John Everitt, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 14/856,509

(22) Filed: Sep. 16, 2015

(65) Prior Publication Data

US 2016/0080732 A1   Mar. 17, 2016

Related U.S. Application Data

(60) Provisional application No. 62/051,897, filed on Sep. 17, 2014.

(51) Int. Cl.
*G09G 1/06* (2006.01)
*H04N 13/327* (2018.01)
(Continued)

(52) U.S. Cl.
CPC ......... *H04N 13/327* (2018.05); *G02B 27/017* (2013.01); *G02B 27/0172* (2013.01);
(Continued)

(58) Field of Classification Search
CPC ............. G02B 27/017; G02B 27/0172; G02B 2027/0187; G06T 19/006; H04N 13/0425; H04N 13/044
See application file for complete search history.

(56) References Cited

U.S. PATENT DOCUMENTS

2002/0105484 A1   8/2002   Navab et al.
2002/0113756 A1*  8/2002   Tuceryan ............ G02B 27/017
                                                      345/8
(Continued)

OTHER PUBLICATIONS

Tuceryan M., et al., "Single point active alignment method (SPAAM) for optical see-through HMD calibration for AR," Proceedings IEEE and ACM International Symposium on Augmented Reality, 2000, pp. 149-158.

*Primary Examiner* — Mark Edwards
(74) *Attorney, Agent, or Firm* — Austin Rapp & Hardman, P.C.

(57) ABSTRACT

Disclosed are a system, apparatus, and method for calibrating an optical see-through display (OSD). The OSD virtual display size is estimated as a starting point for determining an eye to camera distance. In response to determining the eye to camera distance and comparing the result with a measured eye to camera distance an updated display size may be determined. A user's head movement may be tracked in order to determine when a visual alignment based calibration routine is complete. When a user is not viewing a calibration target a request is sent to prompt the user to realign the OSD. When a user is still after a period of alignment with the OSD, the alignment and calibration procedure may be assumed as complete. A buffer may receive calibration values from before and after the calibration procedure is complete and the values may be averaged or filtered for accuracy.

30 Claims, 11 Drawing Sheets

(51) Int. Cl.
*G02B 27/01* (2006.01)
*G06T 19/00* (2011.01)
*H04N 13/344* (2018.01)

(52) U.S. Cl.
CPC ........ *G02B 27/0189* (2013.01); *G06T 19/006* (2013.01); *H04N 13/344* (2018.05); *G02B 2027/0187* (2013.01)

(56) References Cited

U.S. PATENT DOCUMENTS

| | | | |
|---|---|---|---|
| 2003/0107643 A1* | 6/2003 | Yoon | G03B 35/20 |
| | | | 348/47 |
| 2009/0141966 A1* | 6/2009 | Chen | G06T 19/006 |
| | | | 382/154 |
| 2012/0120103 A1 | 5/2012 | Border et al. | |
| 2013/0237811 A1* | 9/2013 | Mihailescu | A61B 5/064 |
| | | | 600/424 |
| 2013/0300636 A1* | 11/2013 | Cunningham | G10L 13/02 |
| | | | 345/8 |
| 2014/0191927 A1 | 7/2014 | Cho | |
| 2014/0333665 A1* | 11/2014 | Sylvan | G02B 27/0149 |
| | | | 345/633 |
| 2016/0018645 A1* | 1/2016 | Haddick | G06T 19/006 |
| | | | 345/8 |

* cited by examiner

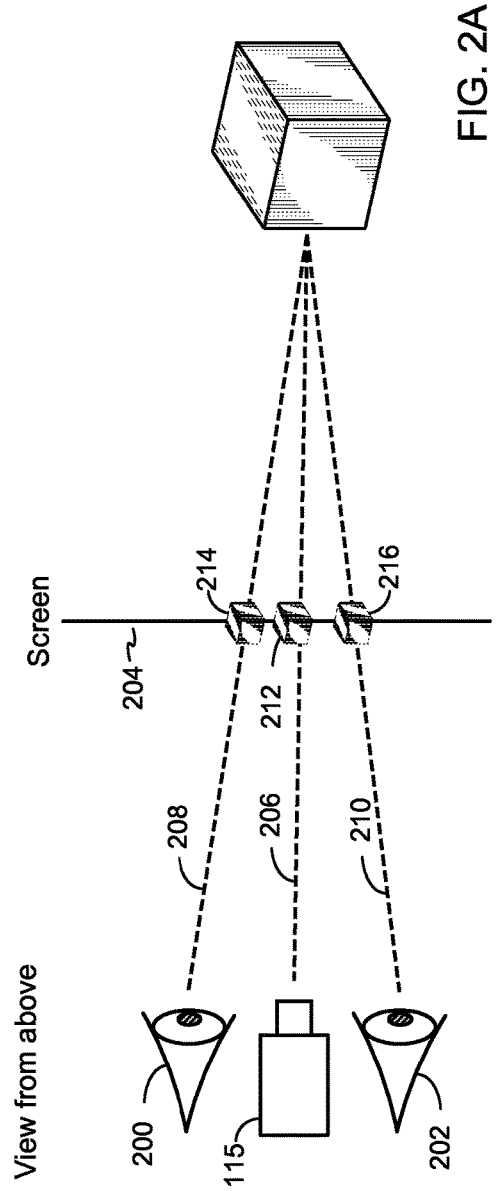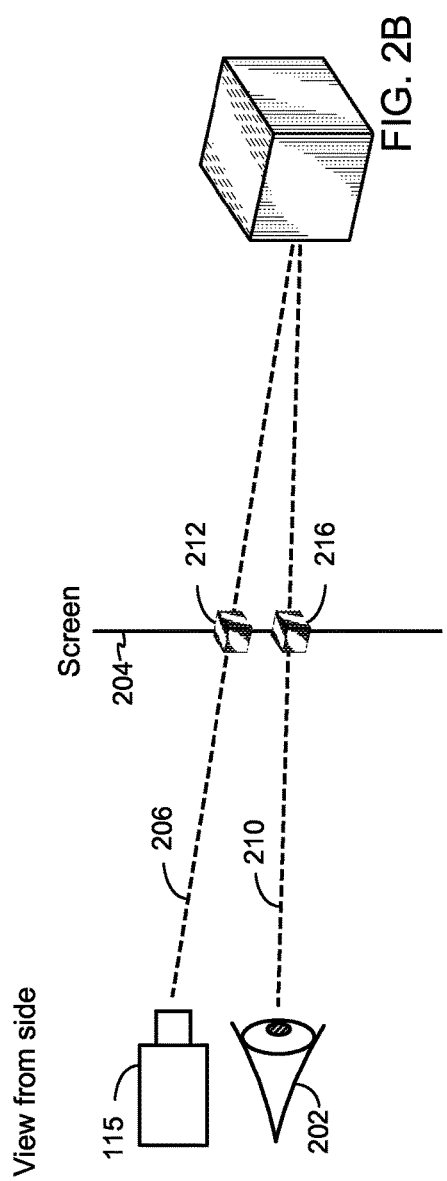

OPTICAL SEE-THROUGH DISPLAY CALIBRATION

CROSS-REFERENCE TO RELATED APPLICATIONS

This application claims the benefit of U.S. Provisional Application No. 62/051,897, entitled, "AUGMENTED REALITY OPTICAL SEE-THROUGH DISPLAY CALIBRATION," filed on Sep. 17, 2014 which is herein incorporated by reference.

FIELD

Various embodiments described herein relate to calibration of optical systems, and more particularly, to calibration of optical see-through displays.

BACKGROUND

Augmented reality (AR) is a live, direct or indirect, view of a physical, real-world environment in which one or more objects or elements are augmented or supplemented by computer-generated sensory input such as sound, video, graphics or GPS data. As a result, a typical AR system is designed to enhance, rather than to replace, one's current perception of reality. Various types of AR systems have been devised for game, entertainment, and other applications involving video. In a typical AR video system, for example, a user is typically able to see a real stationary or moving object, but the user's visual perception of the real object may be augmented or enhanced by a computer or machine generated image of that object.

Two different types of display, namely, video see-through and optical see-through, are used to enhance the user's visual perception of real objects in existing AR systems. In a typical video see-through system, the user sees a live video of a real-world scenario, including one or more particular objects augmented or enhanced on the live video. This type of video see-through system is suitable for various applications, such as video on a phone display. Visual augmentation in video see-through AR systems may be performed by software platforms such as Qualcomm® Vuforia™, a product of Qualcomm Technologies, Inc. and its subsidiaries, for example.

In an optical see-through system with AR features, the user sees objects augmented directly onto the real-world view without a video. In a typical optical see-through system, the user may view physical objects through one or more screens, glasses, or lenses, for example, and computer-enhanced graphics may be projected onto the screens, glasses or lenses to allow the user to obtain enhanced visual perception of one or more physical objects. One type of display used in an optical see-through AR system is a head-mounted display (HMD) having a glass in front of each eye to allow the user to see an object directly, while also allowing an enhanced image of that object to be projected onto the glass to augment the visual perception of that object by the user.

A typical optical see-through display (OSD) such as an OSD with AR features may need to be calibrated for a user such that a computer-enhanced image of an object projected on the display is aligned properly with that object as seen by the user. Conventional schemes have been devised for calibrating OSDs in optical see-through AR systems, but they typically require the user to perform multiple calibration steps manually.

BRIEF DESCRIPTION OF THE DRAWINGS

FIGS. 2A and 2B illustrate simplified top and side views, respectively, of an example of a setup for performing calibration for an OSD, in one embodiment.

SUMMARY OF THE DESCRIPTION

Figure 1A:
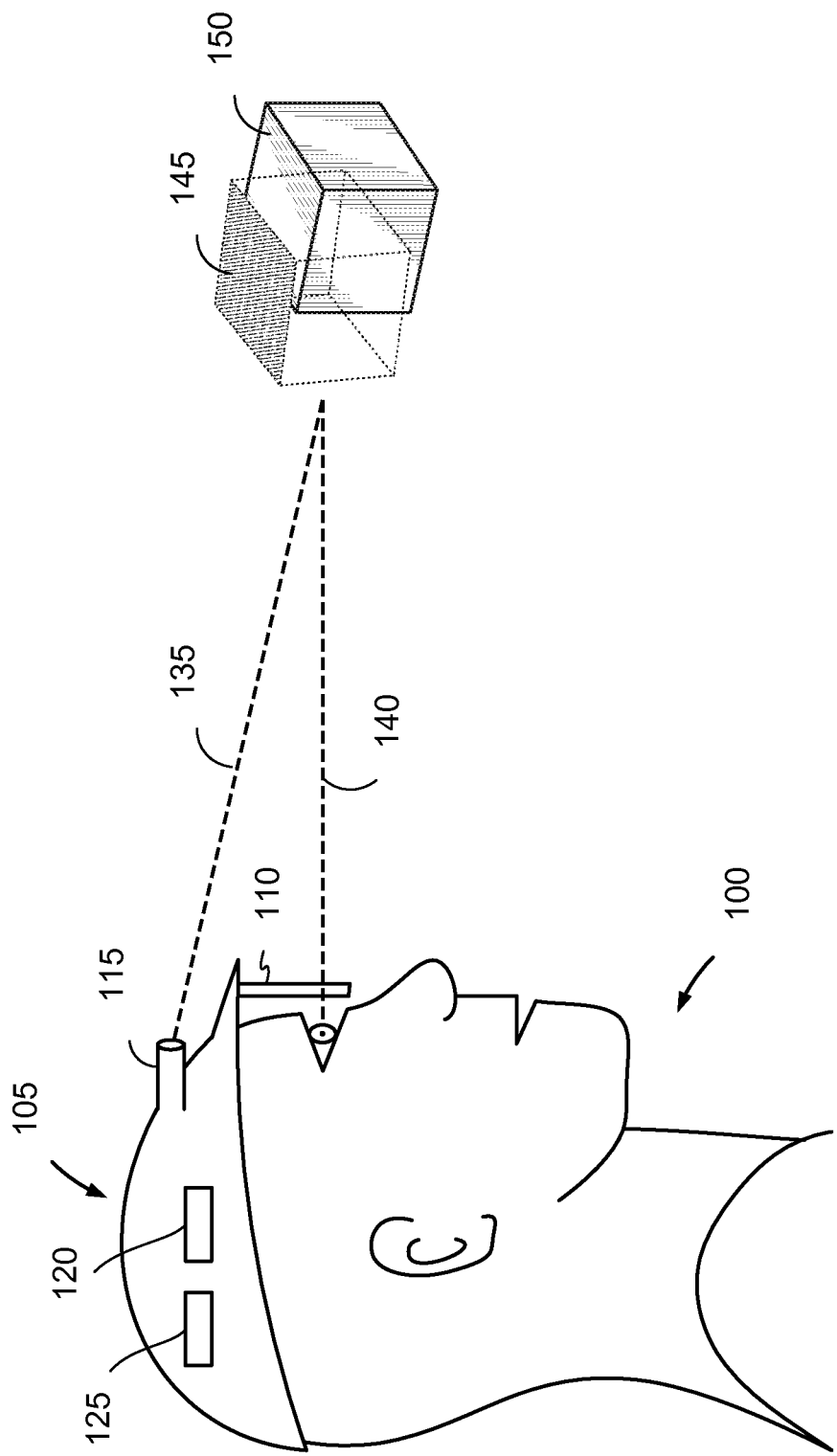
FIG. 1A is a side view of an embodiment of an augmented reality (AR) optical see-through display (OSD) worn by a human user.

Some embodiments discussed herein provide for improved optical see-through display calibration. For example, an OSD virtual display size may be estimated as a starting point for determining an eye to camera distance. In response to determining the eye to camera distance and comparing the result with a measured eye to camera distance an updated display size may be determined A user's head movement may be tracked in order to determine when a visual alignment based calibration routine is complete. When a user is not viewing a calibration target a request is sent to prompt the user to realign the OSD. When a user is still after a period of alignment with the OSD, the alignment and calibration procedure may be assumed as complete. A buffer may receive calibration values from before and after the calibration procedure is assumed complete and the values may be averaged or filtered for accuracy.

In one embodiment, a method of calibrating an optical see-through display includes guiding a user to align a first virtual target on the OSD to a real-world target; collecting, while guiding the user, a first plurality of real-world target poses, each real-world target pose having a first plurality point correspondences to the OSD. The method also includes receiving an indication of a correct alignment between the first virtual target and the real-world target and guiding a user to align a second virtual target on the OSD to a real-world target, wherein the second virtual target has a different position than the first virtual target. The method further includes collecting, while guiding the user, a second plurality of real-world target poses, each real-world target pose having a second plurality of point correspondences to the OSD and receiving an indication of a correct alignment between the second virtual target and the real-world target. The method also includes selecting, according to one or more of time or quality thresholds, a set of point correspondences from the first and second plurality of point correspondences; iteratively refining until a first iteration threshold is met, an estimated eye position with respect to the OSD, where the refining is according to a set of positioning parameters and the set of point correspondences. The method also includes providing, in response to refining meeting the iteration threshold, an initial OSD calibration profile, where the initial OSD calibration profile includes the estimated eye position.

In one embodiment, a device includes a processor and a storage device configurable to store instructions to calibrate an optical see-through display. The device may include instructions to guide a user to align a first virtual target on the OSD to a real-world target; collect, while guiding the user, a first plurality of real-world target poses, each real-world target pose having a first plurality point correspondences to the OSD and receive an indication of a correct alignment between the first virtual target and the real-world target. The device may also include instructions to guide a user to align a second virtual target on the OSD to a real-world target, where the second virtual target has a different position than the first virtual target, and collect, while guiding the user, a second plurality of real-world target poses, each real-world target pose having a second plurality of point correspondences to the OSD. The device may also include instructions to receive an indication of a correct alignment between the second virtual target and the real-world target, and select, according to one or more of time or quality thresholds, a set of point correspondences from the first and second plurality of point correspondences. Additionally, the device may include instructions to iteratively refine until a first iteration threshold is met, an estimated eye position with respect to the OSD, wherein the refining is according to a set of positioning parameters and the set of point correspondences, and provide, in response to refining meeting the iteration threshold, an initial OSD calibration profile, wherein the initial OSD calibration profile includes the estimated eye position.

In one embodiment, a machine readable non-transitory storage medium includes instructions to calibrate an optical see-through display. The medium may include instructions to guide a user to align a first virtual target on the OSD to a real-world target, and collect, while guiding the user, a first plurality of real-world target poses, each real-world target pose having a first plurality point correspondences to the OSD. The medium may include instructions to receive an indication of a correct alignment between the first virtual target and the real-world target, and guide a user to align a second virtual target on the OSD to a real-world target, where the second virtual target has a different position than the first virtual target. The medium may also include instructions to collect, while guiding the user, a second plurality of real-world target poses, each real-world target pose having a second plurality of point correspondences to the OSD, and receive an indication of a correct alignment between the second virtual target and the real-world target; selecting, according to one or more of time or quality thresholds, a set of point correspondences from the first and second plurality of point correspondences. The medium may also include instructions to iteratively refinine until a first iteration threshold is met, an estimated eye position with respect to the OSD, wherein the refining is according to a set of positioning parameters and the set of point correspondences, and provide, in response to refining meeting the iteration threshold, an initial OSD calibration profile, where the initial OSD calibration profile includes the estimated eye position.

In one embodiment, an apparatus includes means for calibrating an optical see-through display. The apparatus may include means for guiding a user to align a first virtual target on the OSD to a real-world target, and means for collecting, while guiding the user, a first plurality of real-world target poses, each real-world target pose having a first plurality point correspondences to the OSD. The apparatus may also include means for receiving an indication of a correct alignment between the first virtual target and the real-world target, and means for guiding a user to align a second virtual target on the OSD to a real-world target, where the second virtual target has a different position than the first virtual target. The apparatus may also include means for collecting, while guiding the user, a second plurality of real-world target poses, each real-world target pose having a second plurality of point correspondences to the OSD, and means for receiving an indication of a correct alignment between the second virtual target and the real-world target. The apparatus may also include means for selecting, according to one or more of time or quality thresholds, a set of point correspondences from the first and second plurality of point correspondences, and means for iteratively refining until a first iteration threshold is met, an estimated eye position with respect to the OSD, where the refining is according to a set of positioning parameters and the set of point correspondences. The apparatus may also include means for providing, in response to refining meeting the iteration threshold, an initial OSD calibration profile, where the initial OSD calibration profile includes the estimated eye position.

The above and other aspects, objects, and features of the present disclosure will become apparent from the following description of various embodiments, given in conjunction with the accompanying drawings.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

As introduced above, types of augmented reality (AR) systems are: video see-through, and optical see-through. In a video see-through system the user sees a live video of the real world and sees objects augmented onto this video. For example, video see-through may be applied for use on a phone display. In contrast to a video see-through display to display AR and a representation of the real world in a video display, in an optical see-through display, the user sees objects augmented directly onto the real-world. As described herein, optical see-through displays (OSDs) includes Head Mounted Displays (HMDs). An OSD can present an additional challenge for AR because each user may have a different eye to display distance and a different eye to camera distance. Furthermore, where video see-through can leverage camera properties to calculate the projection matrix, optical see-through may be calibrated before a projection matrix can be determined Therefore, to maximize accuracy and realism of an optical see-through display (e.g., as used in AR applications), a calibration procedure may be performed. Calibration of the optical see-through display helps augmented objects to appear registered with the real-world. Unlike video see through, optical see-through HMD may not have access to exactly what the user sees, so user feedback is typically used to calibrate the system. The output of such a calibration procedure may be a projection matrix.

In one embodiment, an Optical Display Calibration (ODC) engine or module improves upon current calibration techniques by minimizing the number of calibration procedures performed by a user before an OSD such as an a HMD is calibrated. Furthermore, whereas prior techniques may require measuring a virtual display size of an OSD, ODC approximates a virtual display size during calibration and a refined estimation of virtual display size is iteratively determined. In one embodiment, the distance from the user's eye to the physical screen of the OSD is measured (e.g., by a ruler or other measurement device). The measured distance between the user's eye and the physical screen may be approximate, and ODC can provide an updated refined estimated distance after one or more iterations of processing.

In one embodiment, ODC replaces potentially error inducing physical trigger devices such as mouse presses and touch sensors that are part of some calibration procedures, with techniques to automatically determine when the optical see-through display is aligned with a calibration marker. For example, typically a user might use a mouse or other interface to verify points on a calibration marker to generate 2D-3D correspondences. In one embodiment, instead of relying on a user's physical trigger device, which may produce calibration errors due to vibration or inaccurate readings, ODC displays calibration markers on the target display and the user aligns the calibration marker on the physical screen of the target display by moving with the OSD or moving the real world object in a scene.

In one embodiment, ODC shows the calibration marker when it is determined that the associated real world object to calibrate with the calibration marker is within the viewing area of the OSD. For example, ODC monitors the output of the camera in the OSD can determine whether the real world object to align with the calibration marker is likely within a user's viewpoint. If the real world object is not prominent, (e.g., off center or not fully in the user's viewpoint) then ODC can prompt the user to re-align the view of the OSD towards the real world object in order to trigger the display of the calibration marker.

In one embodiment, ODC instead of triggering a mouse or touch of the OSD to indicate to the OSD that the calibration marker is aligned with the real world object, ODC detects a pause in the user's movements as a trigger to use the current view for calibration. For example, alignment with ODC may be performed by a user without a physical interface such as a mouse, touchpad, etc. ODC will detect a user's movements (e.g., through motion sensors within the ODC) and a pause or lull in user movements may be assumed to be an indication the user has finished moving the calibration marker into alignment with the real world object.

Asking a user to align a point drawn on the OSD with a 3D target point may be an error prone process; it may be difficult for a user to keep the head still during the alignment, especially when a moment of alignment may be confirmed with a manual input on the OSD, such as a button press on the OSD frame or on a breakout box. A sudden, albeit small, head movement may affect the pose matrix, therefore undermining the accuracy of the calibration. In order to mitigate this issue, ODC can collect a short sequence of pose matrices over the most recent half-second to a second (15 to 30 frames on a 30 fps camera), or some other configurable window of frames or time. ODC can use these matrices to generate multiple (e.g., 15 to 30) 2D-3D correspondences for each alignment point instead than a single 2D-3D correspondence when the user confirms the alignment. ODC can process all the correspondences in the calibration process at the same time. Therefore, even if a small head movement happens in the instants preceding the user's confirmation, ODC can refer to other accurate 2D-3D correspondences for a good calibration result. These alternative accurate 2D-3D correspondences will steer both calibration phases towards a better solution that automatically discounts inaccurate alignments. In some embodiments, ODC can continuously gather calibration readings into a buffer. In response to a user's confirmation (e.g., implicit or explicit) of completion of the calibration, multiple readings from the buffer may be averaged. Averaging the multiple readings can smooth out errors introduced by shaking of the user's head during the calibration process.

FIG. 1A illustrates a simplified side view of a human user 100 wearing a head-mounted display (HMD) 105 as an OSD which allows the user 100 to view an object 150 at a distance from the user 100. HMD 105 has a camera 115 and a glass or screen 110 on which an enhanced or augmented image may be projected or otherwise displayed to allow the user 100 to obtain an augmented visual perception of the object 150. Various types of optical see-through devices including various types of HMDs have been developed with augmented reality (AR) features. Before the user 100 can effectively use HMD 105 with AR features, calibration of HMD 105 typically need be performed to ensure that the enhanced or augmented image is aligned properly with the real object as seen by the user 100 through the glass or screen 110. The apparatus and methods according to various embodiments disclosed herein may be implemented for calibration of such HMDs with AR features with relatively few easy steps to be performed by the user.

As illustrated in FIG. 1A, for example, a machine-readable storage medium such as a memory 125 as well as a processor 120 may be provided in HMD 105 for storing and executing instructions to perform process steps for calibration of HMD 105 based upon images obtained by the camera 115. The types of optical see-through displays to be calibrated are not limited to HMDs, however. The apparatus and methods of calibration according to embodiments disclosed herein may be applicable to various types of optical see-through displays, such as a glass frame, for example, with a camera 115 or optical sensor mounted on or near the glass frame. In the embodiment shown in FIG. 1A, the memory 125 and the processor 120 are integrated as part of HMD 105. In addition, a microphone (not illustrated) may be provided on HMD 105 to receive voice input from the user 100 indicating that alignment has been achieved. Alternatively, the user 100 may indicate that alignment has been achieved by various other means of input, such as by pressing a button, a key on a keyboard or keypad, or a soft key on a touch screen, for example. In some embodiments, HMD 105 also has one or more integrated sensors (124) such as motion sensors (e.g., accelerometer, gyroscope, magnetometer, etc.). In some embodiments, the sensors 124 may be part of an inertial measurement unit (IMU) integrated in HMD 105.

In some embodiments, alignment is assumed in response to determining a user has finished performing one or more alignment movements.

As illustrated in FIG. 1, real world object 150 is misaligned from an AR object 145 (e.g., object 145 may also be a calibration marker as described in greater detail below). AR object 145 may be a virtual representation of one or more aspects of real world object 150. As illustrated, AR object is a box or cube with similar dimensions to real world object 150.

Figure 1B:
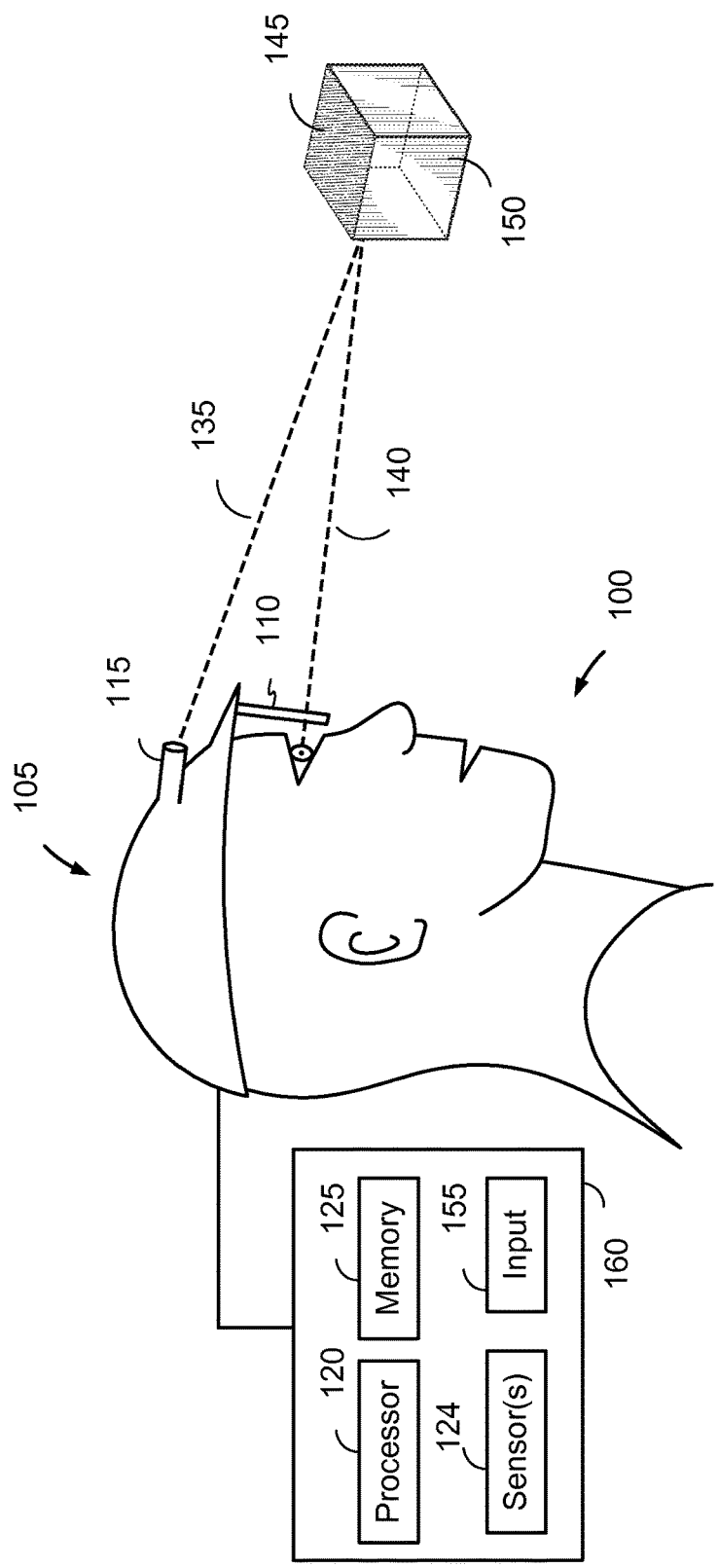
FIG. 1B illustrates a side view of an OSD with memory and the processor implemented in a device separate from the OSD, in one embodiment.

FIG. 1B illustrates a simplified side view similar to FIG. 1, except that the memory 125 and the processor 120 are implemented in a device 160 separate from the HMD 105. In an embodiment, the connection between the device 160 and the HMD 105 is a wired connection. Alternatively, the connection between the device 160 and the HMD 105 is a wireless connection. The device 160 housing the memory 125 and the processor 120 may be a computer, a mobile phone, a tablet, or a game console, for example. In an embodiment, the user 100 may provide input 155 to the processor 120 and memory 125 by pressing a button or key, or by tapping a soft key on a touch screen on the device 160, or by various other means, such as a voice command, for example.

As illustrated in FIG. 1B, real world object 150 is aligned with virtual object 145 such that user 100 sees an overlay of 145 at least partially obscuring the real world object 150.

Figure 1C:
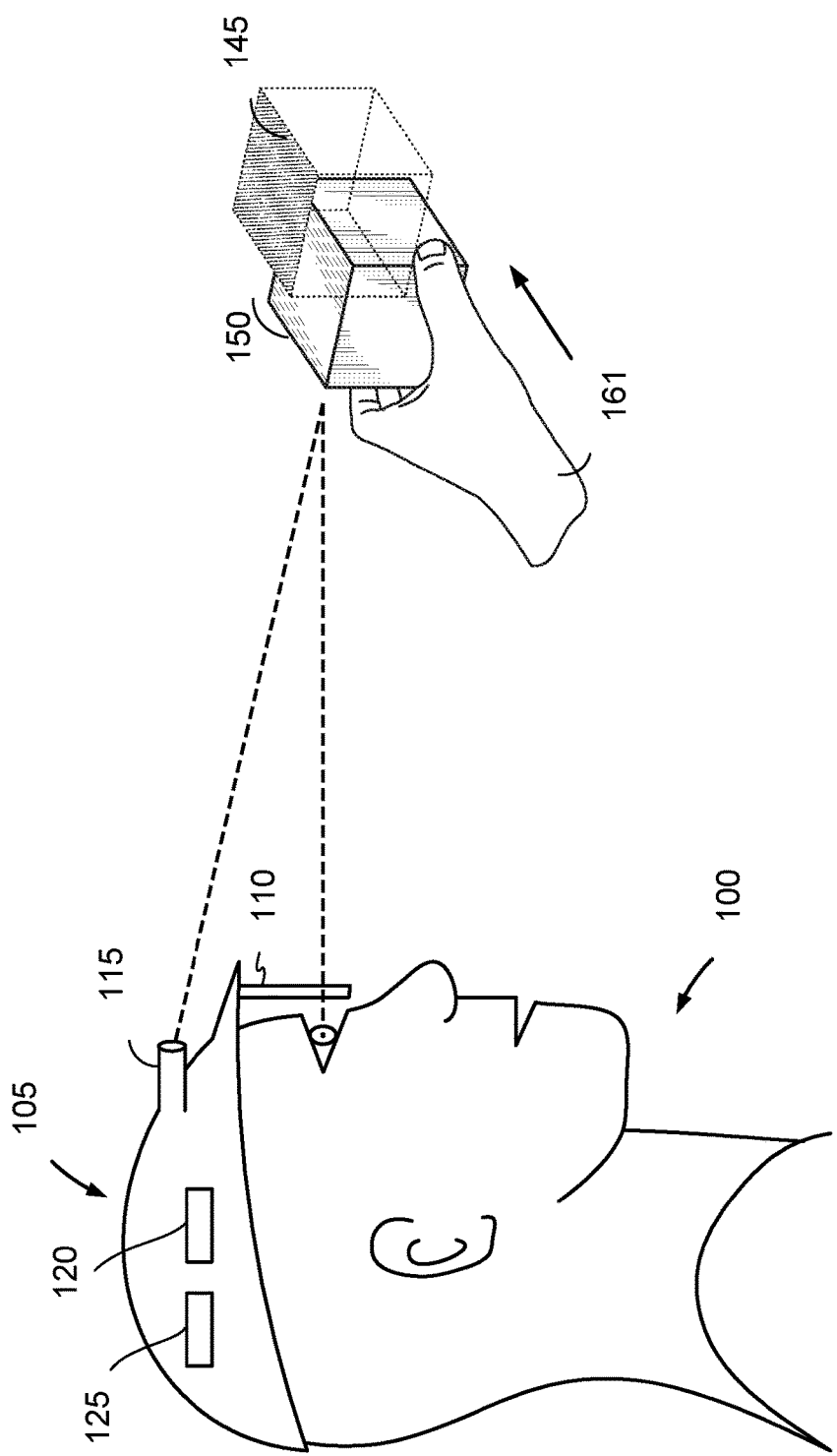
FIG. 1C illustrates user movement to align a real object with a calibration marker, in one embodiment.
Figure 1D:
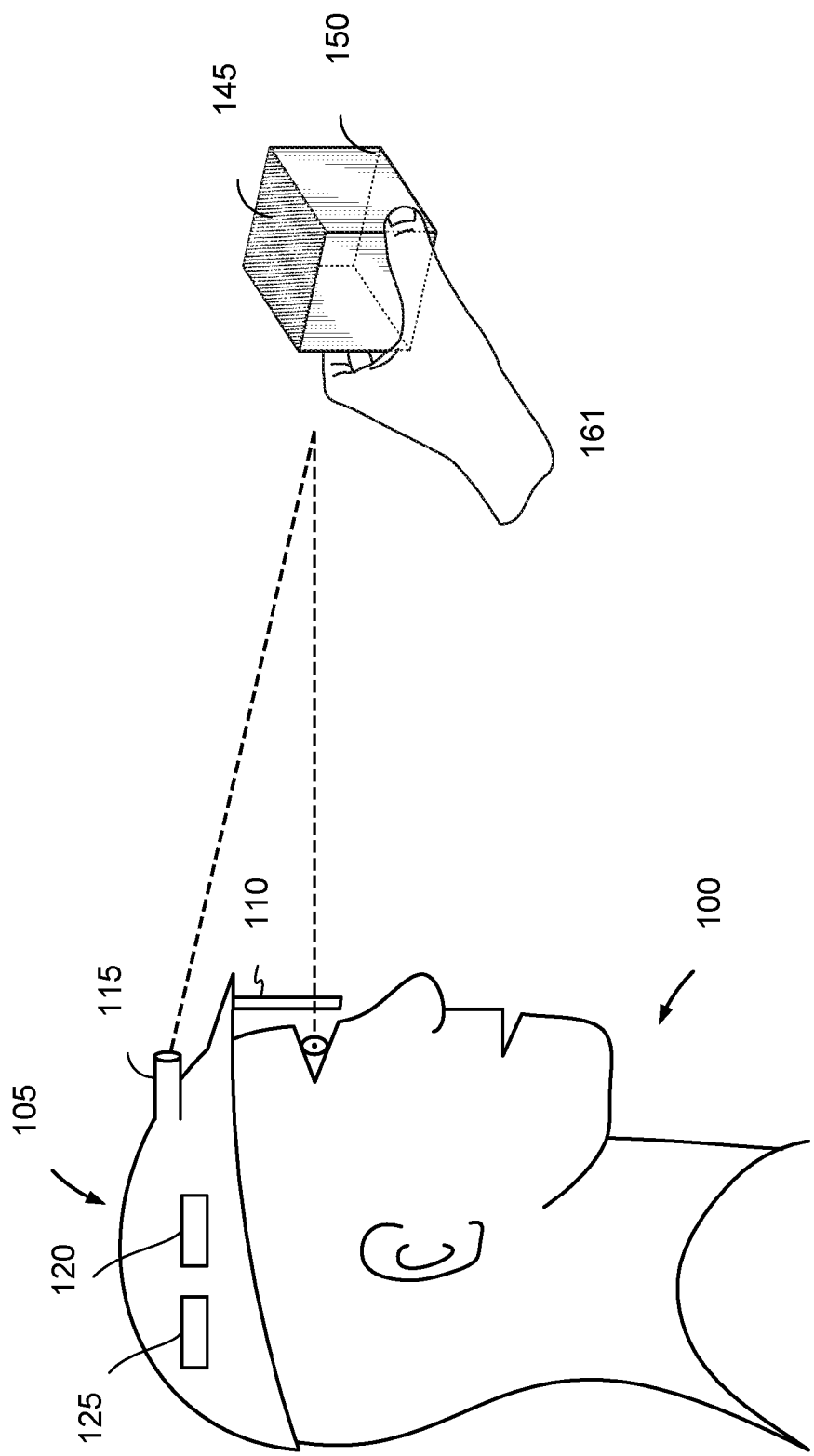
FIG. 1D illustrates user movement to align a real object with a calibration marker, in another embodiment.

FIG. 1C illustrates user movement to align a real object with a calibration marker. FIG. 1C illustrates a user's hand 161 to move real world object 150 as part of a OSD calibration process. In other embodiments, real world object 150 may be fixed and the user 100 may move HMD 105 to align real world object 150 with the virtual object (e.g., calibration marker) 145.

FIGS. 2A and 2B illustrate simplified top and side views, respectively, of an example of a setup for performing calibration for an OSD. For simplicity of illustration, only the camera 115 and eyes 200 and 202 of the user are shown in FIGS. 2A and 2B, without also showing other parts of the HMD 105 as illustrated in FIGS. 2A and 2B. It is understood that optical see-through displays of various designs, shapes and sizes may be implemented without departing from the scope of the invention. In the top view of FIG. 2A, the camera 115 is positioned between the left eye 200 and the right eye 202, although the camera 115 need not be perfectly centered between the two eyes 200 and 202. In the side view of FIG. 2B, the camera 115 is positioned above the right eye 202 and the left eye 200 (not shown).

In an embodiment, when looking through an optical see-through display or HMD, the user typically sees an imaginary or floating screen 204, which is typically about an arm's length away from the user. Because the camera 115 is spaced apart horizontally from each of the eyes 200 and 202 as shown in FIG. 2A, the line of sight 206 of the camera 115 is different from lines of sight 208 and 210 of the left and right eyes 200 and 202, respectively, in the horizontal plane. Likewise, because the camera 115 is also spaced apart vertically from the eye 202 as shown in FIG. 2B, the line of sight 206 of the camera 115 is different from the line of sight 210 in the vertical plane. As a consequence, object 150 is seen by the camera 115 on the floating screen 204 at a position 212 which is different from both the position 214 on the floating screen 204 as seen by the left eye 200, and the position 216 on the floating screen 204 as seen by the right eye 202.

In the top view of FIG. 2A, the position 212 of the object 150 on the floating screen 204 as seen by the camera 115 is spaced apart horizontally from the positions 214 and 216 of the object 150 on the floating screen 204 as seen by the left and right eyes 200 and 202, respectively. Similarly, in the side view of FIG. 2B, the position 212 of the object 150 on the floating screen 204 as seen by the camera 115 is spaced apart vertically from the position 216 of the object 150 on the floating screen 204 as seen by the eye 202. In order to compensate for the fact that the camera 115 has a line of sight 206 to the object 150 different from lines of sight 208 and 210 of the left and right eyes 200 and 202, both horizontally and vertically, methods are provided herein for calibration of the camera 115 using AR markers to allow enhanced or augmented images of objects to be aligned with corresponding real objects as seen by the user on the optical see-through display.

In some embodiments, ODC may be performed in a multi-phase sequence, such that a first phase calculates the position of the user's eye relative to the camera, and a second phase calculates the perspective projection and a more accurate position of the user's eye relative to the camera. The input to the first phase may include: the width w and height h of the display in pixels (or alternatively the ratio between the width w and the height h), the (positive) distance c from the eye to the camera in millimeters along the z-axis, the (positive) distance e from the eye to the display in millimeters along the z-axis, and at least four 3D-2D correspondences. In some embodiments, the (positive) distance c from the eye to the camera in millimeters along the z-axis, and the (positive) distance e from the eye to the display in millimeters along the z-axis may be incorporated into an ODC software device profile that can be customized for various types of OSD.

In some embodiments, the second phase refines the approximation that is the output of the first phase (e.g., approximate estimation of eye to camera). The result of the first phase may be a OSD calibration profile. In one embodiment, the second phase includes a determination of where to project the projection plane (e.g., closer or farther to the user eye).

Measurement of the display may be difficult or inaccurate in some cases. For example, the display may be curved making an accurate ruler measurement by a user challenging to get correct. Even when a manufacturer provides display specifications, the output from a first phase calculation often still may be inaccurate. In one embodiment, instead of using a ruler or manufacturer derived virtual display measurement a starting estimation of the display size is used. In one embodiment, the phase calculation of the camera to eye translation is computed repeatedly with changing display diagonals until a result that is close to the ruler measurement is achieved.

In one embodiment the 2D-3D correspondences can be gathered by drawing a point at a known position on the display, then asking the user to align that with a point on a calibration target. The pose matrix can then be recorded when this alignment step has been performed. Although four points are required to create the pose matrix, multiple points can be gathered in a single step from the user instead of asking the user to provide multiple calibration steps. The pose matrix calculation may be performed using a Perspective-n-Point (PnP) algorithm as known in the art.

In one embodiment, ODC utilizes 2D to 3D correspondences during the first and second phases of calibration. 2D to 3D Correspondences as used herein are a set of pairs in the 2D coordinate form to 3D coordinate form (e.g., 2D coordinate (x1, y1) to 3D coordinate (x1, y1, z1), 2D coordinate (x2, y2) to 3D coordinate (x2, y2, z2) etc.). ODC knows the 2D points (x1, y1), (x2, y2) etc. because these parts are determined as part of the calibration marker drawn on the display of the OSD. For example, a rectangle or other geometric shape on the virtual display of the OSD.

In one embodiment, ODC can collect the 3D points after the user has confirmed that the calibration marker is aligned. For example, when the corner of the rectangle displayed on the OSD display is overlaid with the corners of a rectangle printed on a physical piece of paper or other real object. The 3D values for the points of the printed rectangle may be calculated from data received from the camera viewpoint.

In one embodiment, ODC uses the length of the OSD diagonal d (e.g., in millimeters) as an input to the calibration process. This value may be used to estimate two quantities:

$$\hat{k} = \frac{\sqrt{w^2 + h^2}}{d},$$

where w and h are the width and height of the display pixels and $\hat{f} = e\hat{k}$, where e is the distance between the eye and the display along the z-axis.

A small variation of the value of d (e.g., a fraction of mm) may result in a large variation (tens of mms) in the expected distance along the z-axis between the eye and the camera mounted on the OSD. This value can be read from the entry $t_z$ in the matrix $\hat{W}_{23}$. In a successful first calibration phase, ODC can anticipate $t_z$ to be negative (that is, the eye is placed behind the camera), however an incorrect estimate of the OSD diagonal may lead to a positive value for $t_z$ (that is, the eye is placed in front of the camera). Estimating the OSD diagonal may be error-prone because: the value of d might not be provided by the manufacturer, the display is small in size, so a ruler measurement is likely to be inaccurate, and the display construction might affect the measurement. For example, some displays appear to be slightly curved; hence, the measured value may not reflect the actual diagonal length.

In order to mitigate these issues, instead of measuring the length of the OSD diagonal d, ODC beings with a rough but reasonable based on sample of past measurements and estimations guess, for example d=10 mm (or some other value). ODC then measures the (positive) distance c from the eye to the camera along the z-axis (in millimeters), and iteratively adjusts d until the entry $t_z$ in the matrix $\hat{W}_{23}$ approaches c within a given tolerance. In one embodiment, this is performed using for example a steepest descent technique as follows:

1. $d_{old} = 10$ mm
2. $d_{new} = d_{old} + 1$
3. Compute $\hat{W}_{23}$ as described using $d = d_{old}$
4. $t_z^{old} = \hat{W}_{23}(t_z)$
5. Compute $\hat{W}_{23}$ as described using $d = d_{new}$
6. $t_z^{new} = \hat{W}_{23}(t_z)$
7. $\frac{\partial d}{\partial t_z} = \frac{d^{new} - d^{old}}{t_z^{new} - t_z^{old}}$
8. $\varepsilon = c - t_z^{new}$
   ODC expects $t_z^{new}$ to be positive (eye further away from target than camera)
9. $d_{old} = d_{new}$
10. $d_{old} = d_{new}$
11. $d^{new} = d^{old} - \varepsilon \frac{\partial d}{\partial t_z}$
12. Repeat from #4 until one of the following is true:
    a. Iteration count above given threshold (e.g. 1000)
    b. $\varepsilon$ below given threshold (e.g. 0.001)
    c. $\partial d$ below given threshold (e.g. 0.001)

At the end of the descent $\hat{W}_{23}$ will be the eye pose that places the eye approximately c millimeters behind the camera. In some embodiments this concludes the first phase of the calibration and results in a first or initial OSD calibration profile.

Figure 3:
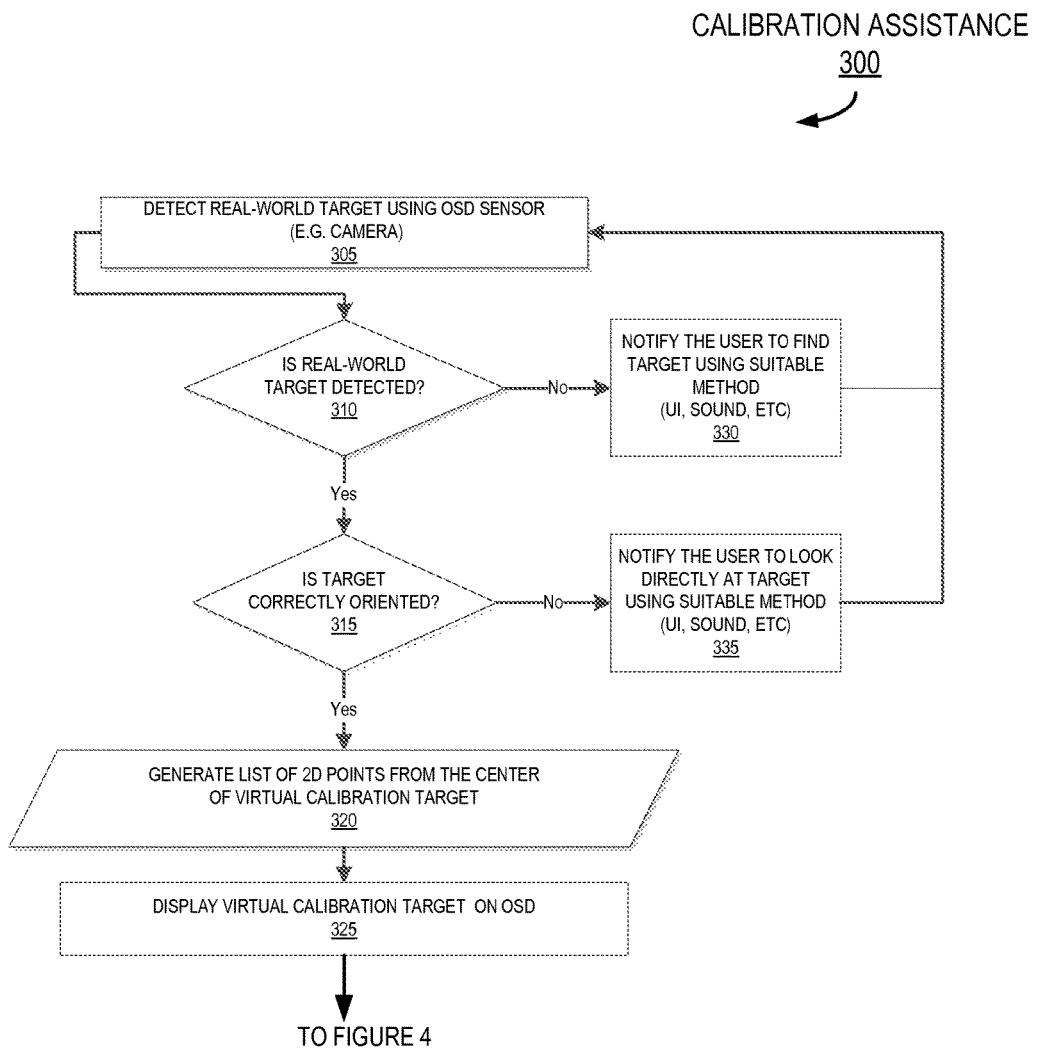
FIG. 3 illustrates a method for guiding a user to correct OSD alignment between a virtual target and a real-world target, in one embodiment.

FIG. 3 illustrates a method for guiding a user to correct OSD alignment between a virtual target and a real-world target, in one embodiment. At block 305, the embodiment detects a real-world target using one or more OSD sensors. For example, the OSD sensor may be a camera sensor.

At block 310, the embodiment determines whether the real-world target is detected. For example the real-world target may be a calibration target to align with a calibration marker (e.g., an AR virtual object such as a rectangle or other shape). Detection (i.e., visibility) of the target may be determined according to a threshold visibility value. For example, a target that is 10% visible from the viewpoint of the OSD may not meet a threshold visibility value in some embodiments. The threshold visibility value may be configurable to values other than 10%. If the target is detected/visible, the embodiment proceeds to block 315, otherwise the embodiment notifies the user to find target using a suitable method at block 330. OSD can request the user look at the target. For example, the user may be looking away from the target and ODC can request that the user re-center their view such that the calibration target is more prominent in the view of the OSD (e.g., centered or close to center). ODC can prompt the user to move the OSD according to an audio or visual interface such as graphical markers within the OSD user interface (e.g., arrows pointing to a direction that the user can move to find the target), audio prompts, or other aids.

At block 315, the embodiment determines whether the target is correctly oriented. If the target is not correctly oriented the embodiment proceeds to block 325 and notifies the user to look directly at the target with correct orientation. For example, ODC may request the user to rotate left/right the viewpoint of the OSD to bring the target into correct orientation. The correct orientation may be a vertical or upright orientation of the calibration target, or any other configurable orientation. In one embodiment, the user may line up the real object such that the object is aligned perpendicularly or horizontally with a user's eyesight (e.g., the line between both eyes). The embodiment may use audio and/or visual techniques as discussed above with regard to block 330.

At block 320, the embodiment generates a list of 2D points from the center of a virtual calibration target. For example, list "P" may contain four or more 2D points from the x, y coordinate center of a virtual calibration target with scale "S."

At block 325, the embodiment displays a virtual calibration target. For example, ODC may display a virtual calibration target (i.e., calibration shape) comprising 2D points "P" on the OSD. The virtual calibration target is also referred to herein as a calibration marker, and is an augmented reality object displayed within the virtual display of the OSD. In some embodiments, the output of method 300 includes a list of 2D points "P" which have coordinates relative to a center <x,y>, and a scale "S" of the virtual target on the OSD. Method 300 may also output "T," which is an empty list providing a framework for 2D to 3D correspondences generated by methods 400 described below. In some embodiments, ODC optionally collects adjacent (in time) 3D target positions. For example, target positions may be saved to a buffer such that after alignment is confirmed, the previous target positions are available for processing. In some embodiments, target positions after alignment is confirmed may also be saved to the buffer. For example, ODC may collect point correspondences for one or both of: a threshold amount of time after the indication of correct alignment, or a threshold amount of time before the indication of correct alignment.

Figure 4:
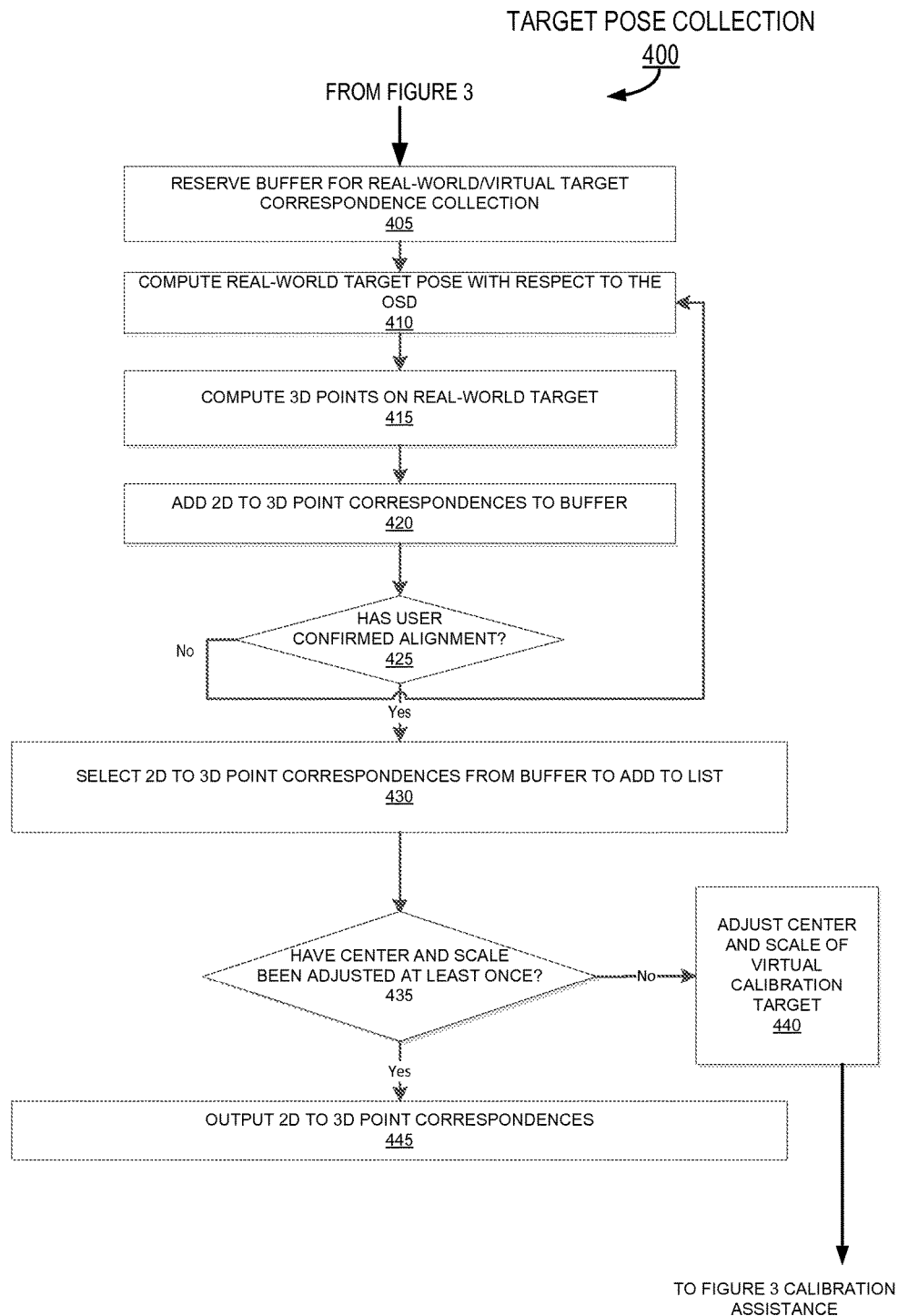
FIG. 4 illustrates a method for collecting real-world target poses, in one embodiment.

FIG. 4 illustrates a method for collecting real-world target poses, in one embodiment. For example, method 400 may receive the list of 2D to 3D points ("P") created by method 300 and compute real-world target poses with respect to the OSD. At block 405, the embodiment reserves a buffer for real-world and virtual target correspondence collection.

At block 410, the embodiment computes real-world target pose with respect to the OSD. In some embodiments pose is determined by matching features in the camera image (e.g., corners, edges, shapes, colors, or other features) with a set of pre-computed features on a flat image of the real-world target. The pose may be computed by finding a rigid transformation that maps some of the pre-computed features with corresponding features in the camera image. In some embodiments, ODC computes a metric describing the quality of the pose according to how well features in the camera image match the pre-computed features.

At block 415, the embodiment computes 3D points on the real-world target. In some embodiments ODC computes 4 or more 3D points on the real-world target, with each 3D point corresponding to a 2D point in "P."

At block 420, the embodiment adds 2D to 3D point correspondences to the buffer. For example, each 2D to 3D point correspondence computed at block 415 may be added to the buffer reserved at block 405.

At block 425, the embodiment determines whether alignment is confirmed. For example, a user may trigger a button or other indication that alignment is completed. In some embodiments, when a user holds the OSD steady (e.g., does not move the OSD) for a threshold amount of time, alignment is considered confirmed.

At block 430, the embodiment selects 2D to 3D point correspondences from the buffer to add to list. For example, ODC associates the 2D points of the OSD display with known 3D target points. ODC can select correspondences according to quality or time metrics and adds the correspondences to list "T." For example, the latest "N" points or points in configurable time periods before or after confirmation may be selected for addition to list "T." In some embodiments, the "N" points for a pose may be tested for quality by checking the closeness of a match to pre-computed points. The quality may be an indication of how well the tracker is performing, for example what proportion of the real-world target the tracker is seeing in the camera image, or whether the real-world target has been located in the current image or its position is being estimated given previous images.

At block 435, the embodiment determines whether center and scale have been adjusted. Or in other words, whether the process is on its first iteration and first target. The second and subsequent iterations may change the center and/or scale to collect different correspondences. If center (e.g., <x,y>) and scale (e.g., scale "S") have not been adjusted, the embodiment adjusts the center <x,y> and scale "S" of the virtual calibration target at block 440. If center <x,y> and scale "S" have been adjusted, the embodiment outputs point correspondences at block 445. For example, the output may be a list "T" of 8 or more 2D to 3D point correspondences.

Figure 5:
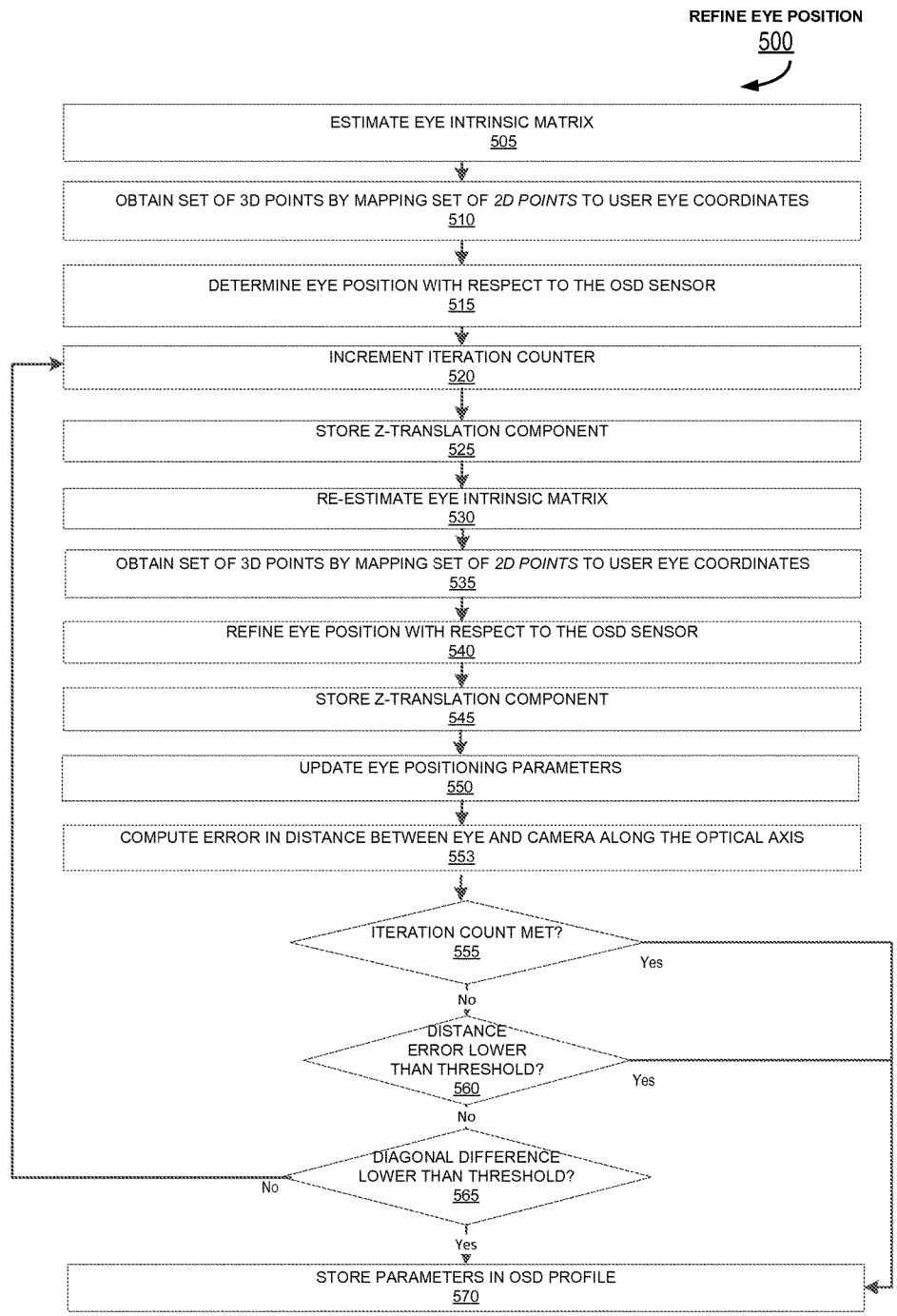
FIG. 5 illustrates a method for refining eye position, in one embodiment.

FIG. 5 illustrates a method for refining eye position, in one embodiment. ODC may iteratively refine approximate eye position with respect to the OSD sensor. In one embodiment, ODC receives input comprising one or more of a 2D to 3D point correspondences list "T," display measurements (e.g., OSD pixel width "W," OSD pixel height "H"), eye to camera distance, and eye to display distance (e.g., distance "e" measured along a single coordinate axis). The 2D to 3D correspondences may be four or more known points to use as correspondences to 3D points in an environment. A correspondence matches a 2D screen display co-ordinate to a real-world 3D point. The display measurements may be height and width of the physical screen of the OSD. The display measurements may alternatively be the diagonal measurement of the physical screen. The eye to camera distance may be a distance from the user's eye to the camera within the OSD. Calibration may be performed per eye. Although the camera distance for the first eye might differ from the camera distance for the second eye ODC may assume the two distances for each eye are identical to avoid having to measure each eye for each user.

At block 505, the embodiment estimates an eye intrinsic matrix. For example, the eye intrinsic matrix may be matrix "A" and calculated according to parameters W, H, E, and $d_{old}$ as introduced above. An eye intrinsic matrix as used herein may contain one or more of the focal length from the eye to the virtual display along the horizontal and vertical axes, and an offset between the virtual display and the eye along the horizontal and vertical axes.

At block 510, the embodiment obtains a set of 3D points by mapping 2D points to the user eye coordinates. As used herein, user eye coordinates is the 3D coordinate system with origin located at the eye pupil position. In one embodiment, ODC can determine the 3D points "PE" from mapping the set of 2D points in list "T" to eye coordinates using matrix "A."

At block 515, the embodiment can determines eye pose with respect to the OSD sensor. For example, ODC can compute eye position "E" by solving the absolute orientation problem to find a transformation that matches points in "PE" with 3D points in list "T."

At block 520, the embodiment increments an iteration counter. In some embodiments, the iteration counter "I" may be initialized to "0" or some other configurable number. If initialized to "0" ODC may increment the counter until a threshold value is reached, or if initialized to another number ODC may decrement the number until the counter reaches "0" or some other configurable result.

At block 525, the embodiment stores Z-translation component. For example, the Z-translation component (i.e., the distance between the eye and the camera along a user's eye optical axis) from "E" in $z_{old}$.

At block 530, the embodiment re-estimates the eye intrinsic matrix. For example, ODC can compute an approximate eye intrinsic matrix "A" using parameters W, H, E, and $d_{new}$.

At block 535, the embodiment obtains a set of 3D points by mapping 2D points to the user eye coordinates. For example, ODC can determine the 3D points "PE" from mapping the set of 2D points in list "T" to eye coordinates using matrix "A."

At block 540, the embodiment re-determines eye pose with respect to the OSD sensor. For example, ODC can compute eye position "E" by solving the absolute orientation problem to find a transformation that matches points in "PE" with 3D points in list "T."

At block 545, the embodiment stores Z-translation component. For example, the Z-translation component from "E" in $z_{new}$.

At block 550, the embodiment updates eye positioning parameters. For example, ODC can update slope, $d_{old}$, and $d_{new}$ (slope=$(d_{new}-d_{old})/(z_{new}-z_{old})$, $d_{old}=d_{new}$, $d_{new}=d_{old}-$error(DIFF)). In one embodiment, ODC increments or decrements the estimated display size d to a next larger or next smaller display size as part of the process to determine an actual display size. For example if $d_{old}$ is 10 mm, $d_{new}$ may be $d_{old}$+change (e.g., 10 mm+1 mm or some other value). In one embodiment, ODC computes a user's eye pose using the initially estimated display size (e.g., $d_{old}$).

At block 553, the embodiment computes error in distance between eye and camera along the optical axis. For example, error=$c-z_{new}$. In some embodiments, the error may be calculated earlier at block 550 and included with other eye positioning parameters.

At block 555, the embodiment determines whether the iteration count is met. For example, ODC can iterate until a configurable number of iterations set by "I." When the count is met, ODC can proceed to block 570 and stores parameters, otherwise ODC determines whether an error count is lower than a threshold at block 560.

At block 560, ODC determines if the error count is lower than a threshold. If the error count is lower than a threshold ODC continues to block 570 and stores parameters, otherwise ODC determines whether the change between previous and current diagonal values are lower than a threshold at block 565. If the change in diagonal values is lower than a threshold then ODC continues to block 570 and stores parameters, otherwise ODC returns to block 520 and increments the iteration counter.

At block 570, the embodiment stores parameters in the OSD profile. If the OSD profile is already created, ODC updates the existing parameters, otherwise a new OSD profile is created with the parameters from method 500. For example, profile "H" may include eye pose "E" with respect to the OSD sensor, eye-to-display distance "E," OSD diagonal value "d"=$d_{old}$.

Figure 6:
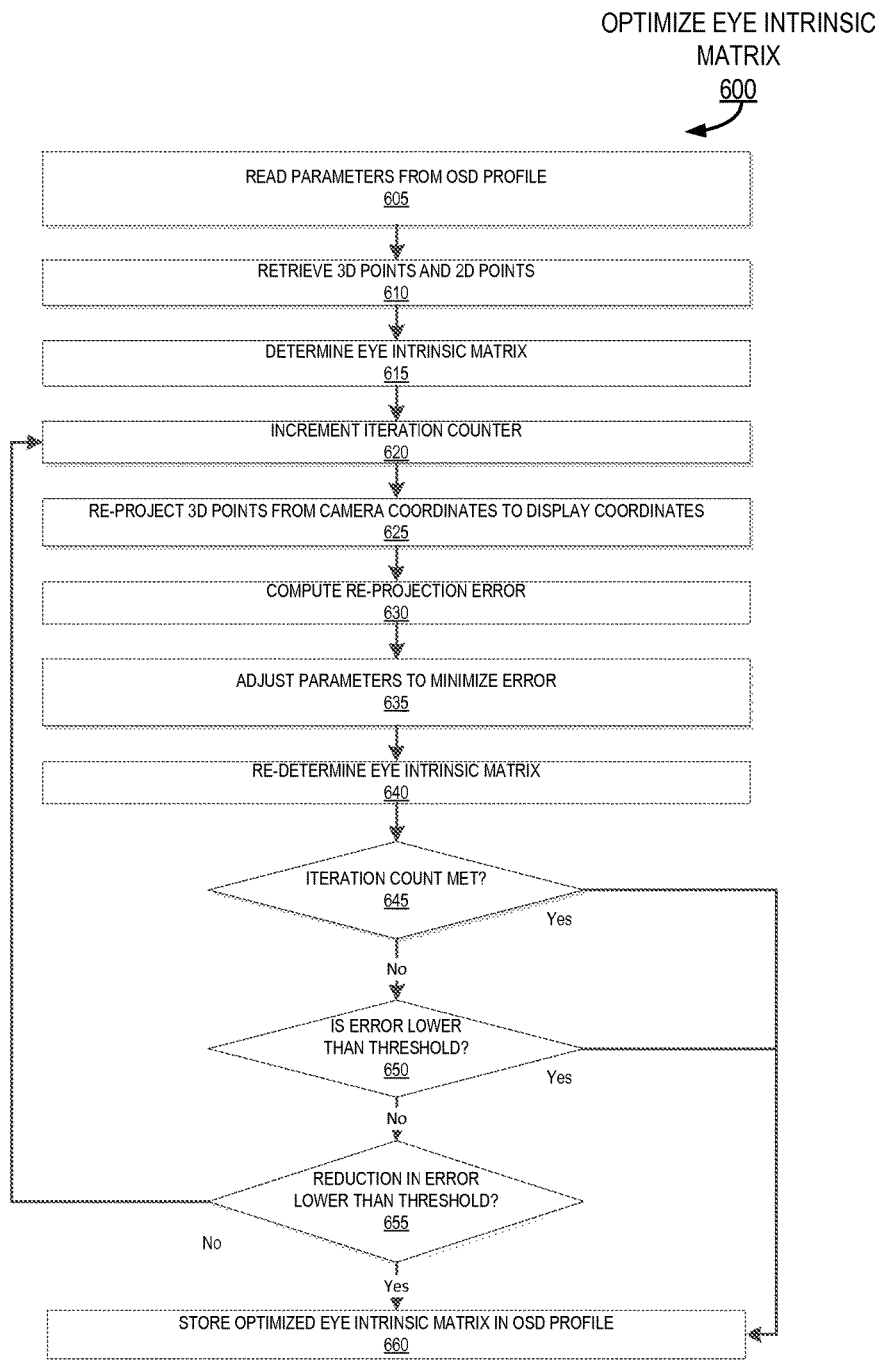
FIG. 6 illustrates a method for optimizing an eye intrinsic matrix, in one embodiment.

FIG. 6 illustrates a method for optimizing an eye intrinsic matrix, in one embodiment. In some embodiments, FIG. 6 illustrates a $2^{nd}$ phase of ODC to optimize the eye intrinsic matrix "A" described herein. At block 605, the embodiment (e.g., ODC) reads parameters from the OSD profile (e.g., the profile created by method 500 above.

At block 610, the embodiment retrieves 3D points and 2D points. For example, 3D points and 2D points may be retrieved from List "T."

At block 615, the embodiment re-determines the eye intrinsic matrix. For example, ODC can compute eye intrinsic matrix "A" using parameters "W," "H," and "D".

At block 620, the embodiment increments the iteration counter.

At block 625, the embodiment re-projects 3D points from camera coordinates to display coordinates.

At block 630, the embodiment computes the re-projection error. For example, the re-projection error (i.e., the sum of the distances between each 2D point retrieved from list T and the corresponding 3D point position re-projected into display coordinates) may be computed as TD−TE. In some embodiments, the re-projection error is computed in terms of pixels.

At block 635, the embodiment adjusts parameters to minimize error. For example, ODC can adjust parameters "E", and "d" in order to minimize error using weighted least square optimization.

At block 640, the embodiment re-determines the eye intrinsic matrix. For example, ODC can re-compute the eye intrinsic matrix "A" using parameters "W," "H," "E," and "D."

At block 645, the embodiment determines whether the iteration count is met. If the iteration count is met, the embodiment proceeds to block 660. Otherwise, the embodiment determines whether the re-projection error of block 630 is lower than a threshold (e.g., a set number of pixels) at block 650. If the re-projection error of block 630 is less than a threshold the embodiment continues to block 660, otherwise the embodiment determines whether the reduction in re-projection error is lower than a threshold at block 655. If the reduction in re-projection error is not lower than a threshold, the embodiment returns to block 620 and increments the iteration counter. If the reduction in re-projection error is lower than a threshold the embodiment continues to block 660.

At block 660, the embodiment stores parameters in the OSD profile. For example, the embodiment may store optimized eye intrinsic matrix "A."

Figure 7:
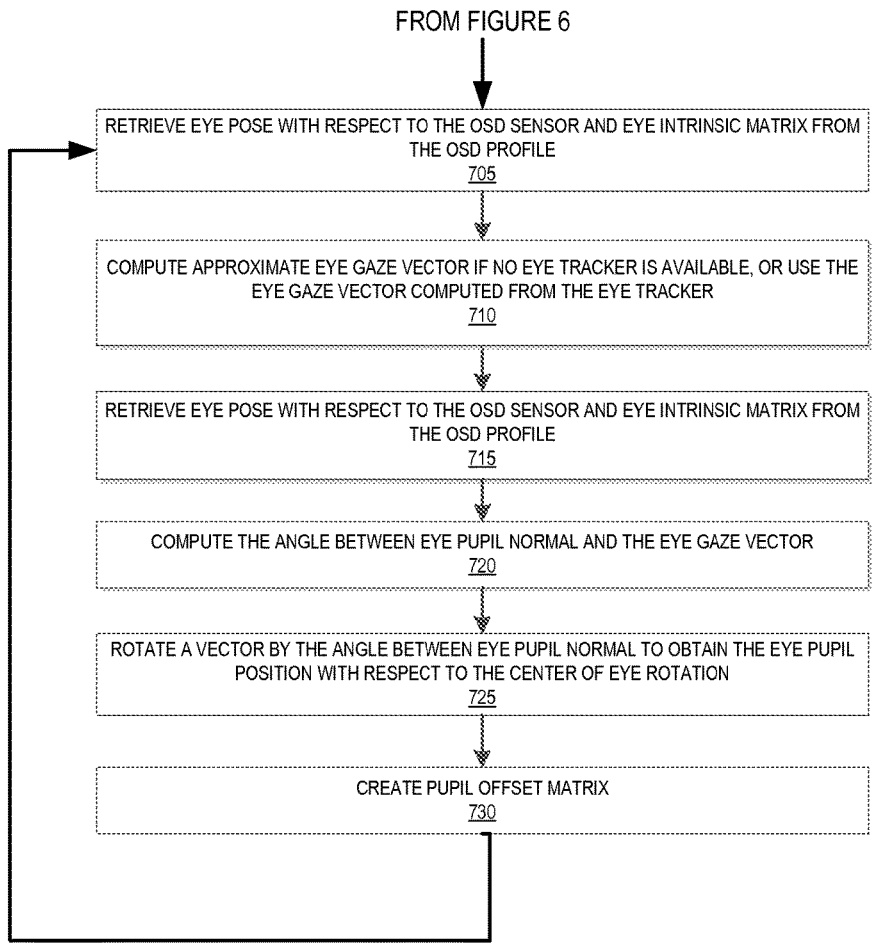
FIG. 7 illustrates a method for dynamic eye calibration optimization, in one embodiment.

FIG. 7 illustrates a method for dynamic eye calibration optimization, in one embodiment. In one embodiment, ODC uses an eye tracker or assumes that the user is looking at a particular tracked target for dynamic eye calibration. ODC may use an eye tracker during standard calibration if available. For example, utilizing an eye tracker, ODC may skip the first phase of calibration as described above (e.g., FIGS. 3-5) by utilizing a pose provided by the eye tracker. The pose provided by the eye tracker locates the eye with respect to the camera and may be used as an input to the second calibration phase (e.g., FIG. 6). In some embodiments, after calibration is completed as described in FIGS. 3-6, ODC performs a dynamic calibration adjustment according to the user's eye gaze. ODC can either use the eye tracker to determine the user's gaze, or the gaze may be approximated by assuming the user is looking at the target in the real world. In either case, ODC can compute an eye pose offset (e.g., offset "O") which describes the 3D pupil offset from its natural position looking forward from the middle of the eye. By applying this adjustment "O" to the pose "E," ODC can adjust for eye vergence (i.e., the inward/outward movement of the eye when it fixates at a certain distance).

At block 705, the embodiment retrieves eye pose with respect to the OSD sensor and eye intrinsic matrix from the OSD profile. For example, eye pose "E" and matrix "A" from OSD profile "H."

At block 710, the embodiment computes approximate eye gaze vector if no eye tracker is available, or uses the eye gaze vector computed from the eye tracker.

At block 715, the embodiment retrieves eye pose with respect to the OSD sensor and eye intrinsic matrix from the OSD profile. For example, eye pose "E" and matrix "A" from OSD profile "H."

At block 720, the embodiment computes the angle between eye pupil normal and the eye gaze vector from block 710. For example, angle "a" between normal n=(0,0,1) and gaze vector "g."

At block 725, the embodiment rotates a vector by the angle between eye pupil normal to obtain the eye pupil position with respect to the center of eye rotation. For example, the vector may be a vector "r"=(0,0,r) and pupil position may be position "p."

At block 730, the embodiment creates pupil offset matrix. For example, pupil offset matrix may have translation part set to the vector "r"−pupil position "p." In some embodiments, the output of the dynamic calibration is a calibration matrix (e.g., matrix "C"=("A")("E")("O")).

Figure 8:
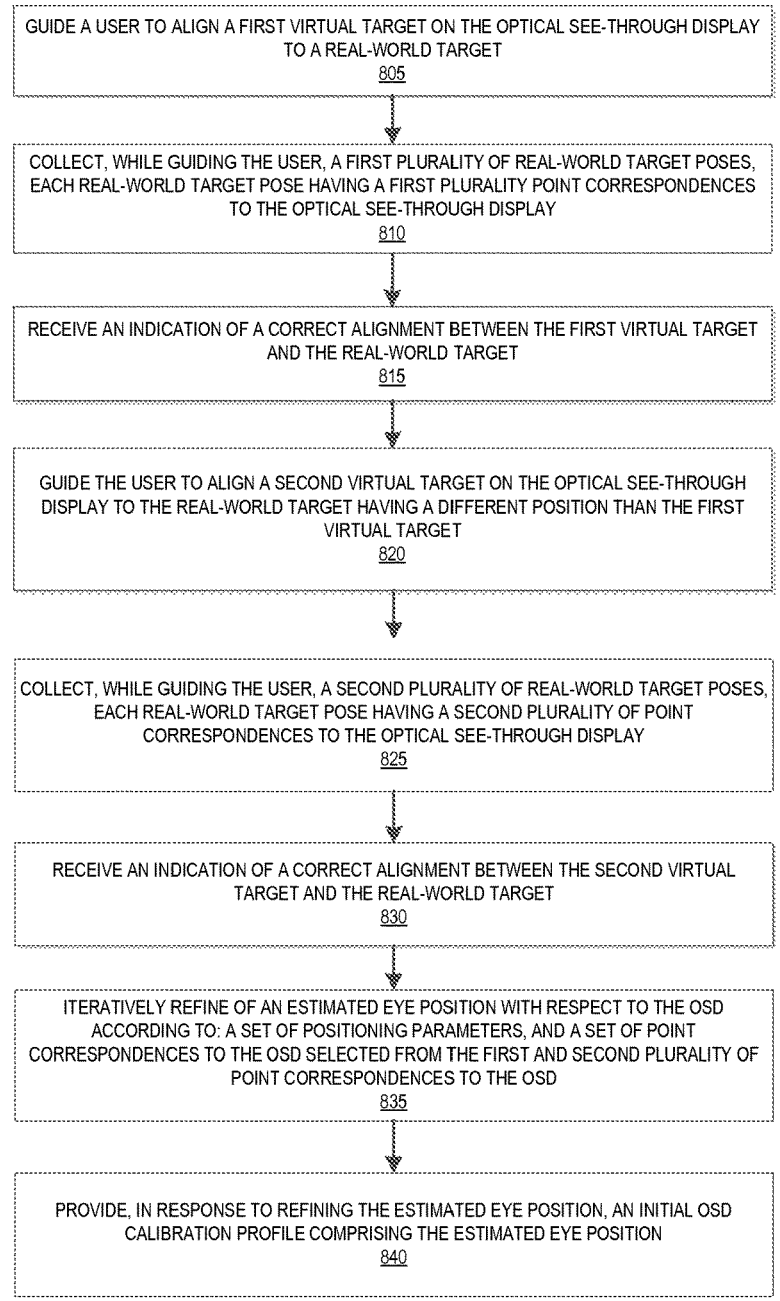
FIG. 8 illustrates a method for generating an eye calibration profile, in one embodiment.

FIG. 8 illustrates a method for generating an initial eye calibration profile, in one embodiment. At block 805, the embodiment (e.g., ODC) guides a user to align a first virtual target on the optical see-through display (OSD) to a real-world target.

At block 810, the embodiment collects, while guiding the user, a first plurality of real-world target poses, each real-world target pose having a first plurality point correspondences to the OSD.

At block 815, the embodiment receives an indication of a correct alignment between the first virtual target and the real-world target.

At block 820, the embodiment guides the user to align a second virtual target on the OSD to a real-world target, where the second virtual target has a different position than the first virtual target. The second virtual target may have a different scale and center point on the OSD than the first virtual target.

At block 825, the embodiment collects, while guiding the user, a second plurality of real-world target poses, each real-world target pose having a second plurality of point correspondences to the OSD.

At block 830, the embodiment receives an indication of a correct alignment between the second virtual target and the real-world target. In some embodiments, in response to receiving an indication of correct alignment between one or both of the first and second virtual target, point correspondences are collected for a threshold amount of time after the indication of correct alignment. For example, although alignment is thought to be correct, the user may move or shift at the last moment before alignment confirmation, therefore ODC may capture a buffer of coordinates that may be more accurate than the coordinates at time of calibration confirmation.

At block 835, the embodiment iteratively refines an estimated eye position with respect to the OSD, wherein the refining is according to a set of positioning parameters and the set of point correspondences. For example, iterative refinement can include the rigid geometric transformation between the position of the camera sensor and the position of the eye pupil. In one embodiment, the rigid transformation consists of a translation and a rotation in 3D space. The refinement reads a set of 2D-3D point correspondences and an initial estimate for the eye perspective transformation, which encodes the eye intrinsic parameters (e.g., focal length, and offset between the eye pupil and the display). In one embodiment, point correspondences are collected by asking the user to align a real-world shape with a corresponding shape shown on the display while tracking the position of the real-world shape. In one embodiment, the positioning parameters are used to compute an estimate for the eye perspective transformation and an estimate size of the virtual display.

In some embodiments, in each iteration from block 835, the 2D points in the correspondences are re-mapped into 3D points as perceived by the eye using the eye intrinsic parameters and the size of the virtual display. The rigid transformation between camera and eye may be computed by matching the re-mapped 3D points with the 3D points in the correspondences using for example, a Perspective-and-Point approach. The translation component in the rigid transformation may be compared with an expected value pre-computed for the HMD. In one embodiment, if the translation component is far from the expected value, the estimate size of the virtual display is adjusted and the process performs an additional iteration, otherwise the process terminates and outputs the refined rigid transformation. In one embodiment, in response to determining/receiving the refined rigid transformation, refinement of the eye perspective transformation is performed to minimize the re-projection error between the 2D points in the correspondences and the 3D points are re-mapped onto the display coordinates using the rigid geometric transformation and the eye perspective transformation.

In one embodiment, the set of positioning parameters of block 835 includes a width to height ratio of the OSD, an eye to camera distance along a single coordinate axis, and an initial estimated eye position with respect to the OSD. The first iteration threshold may include one or more of: an error threshold, an iteration count, or a difference in display diagonal value threshold. In some embodiments, ODC selects according to one or more of time or quality thresholds, a set of point correspondences from the first and second plurality of point correspondences. In some embodiments, instead of or in addition to the width to height ratio of the OSD, separate width measurement and height measurements may be included.

At block 840, the embodiment provides, in response to refining the estimated eye position, an initial OSD calibration profile comprising the estimated eye position. In some embodiments, the initial calibration profile concludes the end of a first phase for ODC and may be used as input for a second phase to determine an eye intrinsic matrix as described above. For example, ODC may determine an eye intrinsic matrix from at least the estimated eye position and the set of positioning parameters from the initial calibration profile. ODC may also iteratively re-determine the eye intrinsic matrix by adjusting one or more of the set of positioning parameters until a second iteration threshold is met, where the second iteration threshold includes one or more of: an iteration counter, error threshold, or change in error threshold. In some embodiments, the initial calibration profile is determined from a sample of a plurality of different users (e.g., a set of users meant to approximate a general user base). In some embodiments, a different initial calibration profile is determined for each of a plurality of different types of OSDs (e.g., each OSD manufacturer may have different specifications that should be taken into account, such as different display size measurements and distance from eyes).

In some embodiments, in response to re-determining the eye intrinsic matrix, ODC can utilize an eye tracker or assumptions of a user eye position to further calibrate the OSD. For example, ODC may determine an eye gaze vector from one or more of: an eye tracker or assuming a user is looking at the virtual target and determines an eye position offset from the eye gaze vector. The ODC may also adjust the estimated eye position with respect to the OSD according to the eye position offset and the eye gaze vector.

The embodiments described herein may be implemented as software, firmware, hardware, module, or engine. In one embodiment, the processor 120 and memory 125 in device 160 or within the HMD 105 may implement aspects of the previous description (for example, the method of FIGS. 3-8). Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a compact disc read only memory (CD-ROM), digital versatile disc (DVD), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (e.g., device 160 or HMD 105), software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer, or data processing device/system. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the," are intended to include the plural forms as well, unless the context clearly indicates otherwise. It will be further understood that the terms "comprises," "comprising," "includes," or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise.

Furthermore, many embodiments are described in terms of sequences of actions to be performed by, for example, elements of a computing device. It will be recognized that various actions described herein can be performed by specific circuits, such as application specific integrated circuits (ASICs), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

What is claimed is:

1. A method of calibrating an optical see-through display (OSD), the method comprising:
   guiding a user to align a first virtual target on the OSD to a real-world target;
   collecting, while guiding the user, a first plurality of real-world target poses, each real-world target pose having a first plurality of point correspondences to the OSD;
   receiving an indication of a correct alignment between the first virtual target and the real-world target;
   guiding the user to align a second virtual target on the OSD to the real-world target, the second virtual target having a different position than the first virtual target;
   collecting, while guiding the user, a second plurality of real-world target poses, each real-world target pose having a second plurality of point correspondences to the OSD;
   receiving an indication of a correct alignment between the second virtual target and the real-world target;
   iteratively refining an estimated eye position with respect to the OSD according to:
      a set of positioning parameters, and
      a set of point correspondences to the OSD selected from the first and second plurality of point correspondences to the OSD, wherein the iteratively refining includes a rigid geometric transformation between an image sensor and a position of an eye pupil; and
   providing, in response to refining the estimated eye position, an initial OSD calibration profile comprising the estimated eye position.

2. The method of claim 1, wherein the iterative refining occurs until an iteration threshold is met, the iteration threshold comprising one or more of: an error threshold, an iteration count, or a change in display diagonal value threshold.

3. The method of claim 1, wherein the set of positioning parameters includes a width to height ratio of the OSD, an eye to camera distance along a user's eye optical axis, and an initial estimated eye position with respect to the OSD.

4. The method of claim 1, wherein the second virtual target has a different scale and center point on the OSD than the first virtual target.

5. The method of claim 1, further comprising:
   determining an eye intrinsic matrix from at least the estimated eye position and the set of positioning parameters from the initial calibration profile; and
   iteratively re-determining the eye intrinsic matrix by adjusting one or more of the set of positioning parameters until an iteration threshold is met, wherein the iteration threshold includes one or more of: an iteration counter, error threshold, or change in error threshold.

6. The method of claim 1, further comprising:
   determining an eye gaze vector from one or more of: an eye tracker or assuming a user is looking at the virtual target;
   determining an eye position offset from the eye gaze vector; and
   adjusting the estimated eye position with respect to the OSD according to the eye position offset and the eye gaze vector.

7. The method of claim 1, wherein the set of point correspondences to the OSD are selected according to one or more of time or quality thresholds.

8. The method of claim 1, wherein the initial calibration profile is determined from a sample of a plurality of different users.

9. The method of claim 1, wherein a different initial calibration profile is determined for each of a plurality of different types of OSDs.

10. The method of claim 1, further comprising:
    collecting point correspondences for one or both of: a threshold amount of time after the indication of correct alignment, or a threshold amount of time before the indication of correct alignment.

11. A device comprising:
    a processor;
    a storage device coupled to the processor and configurable for storing instructions, which, when executed by the processor cause the processor to:
    guide a user to align a first virtual target on the OSD to a real-world target;
    collect, while guiding the user, a first plurality of real-world target poses, each real-world target pose having a first plurality of point correspondences to the OSD;
    receive an indication of a correct alignment between the first virtual target and the real-world target;
    guide the user to align a second virtual target on the OSD to the real-world target, the second virtual target having a different position than the first virtual target;
    collect, while guiding the user, a second plurality of real-world target poses, each real-world target pose having a second plurality of point correspondences to the OSD;
    receive an indication of a correct alignment between the second virtual target and the real-world target;
    iteratively refine an estimated eye position with respect to the OSD according to:
       a set of positioning parameters, and
       a set of point correspondences to the OSD selected from the first and second plurality of point correspondences to the OSD, wherein the iteratively refining includes a rigid geometric transformation between an image sensor and a position of an eye pupil; and
    provide, in response to refining the estimated eye position, an initial OSD calibration profile comprising the estimated eye position.

12. The device of claim 11, wherein the iterative refining occurs until an iteration threshold is met, the iteration threshold comprising one or more of: an error threshold, an iteration count, or a change in display diagonal value threshold.

13. The device of claim 11, wherein the set of positioning parameters includes a width to height ratio of the OSD, an eye to camera distance along a user's eye optical axis, and an initial estimated eye position with respect to the OSD.

14. The device of claim 11, wherein the second virtual target has a different scale and center point on the OSD than the first virtual target.

15. The device of claim 11, further comprising instructions to:
    determine an eye intrinsic matrix from at least the estimated eye position and the set of positioning parameters from the initial calibration profile; and
    iteratively re-determine the eye intrinsic matrix by adjusting one or more of the set of positioning parameters until a second iteration threshold is met, wherein the second iteration threshold includes one or more of: an iteration counter, error threshold, or change in error threshold.

16. The device of claim 11, further comprising:
  determine an eye gaze vector from one or more of: an eye tracker or assuming a user is looking at the virtual target;
  determine an eye position offset from the eye gaze vector; and
  adjust the estimated eye position with respect to the OSD according to the eye position offset and the eye gaze vector.

17. The device of claim 11, wherein the set of point correspondences to the OSD are selected according to one or more of time or quality thresholds.

18. The device of claim 11, wherein the initial calibration profile is determined from a sample of a plurality of different users.

19. The device of claim 11, wherein a different initial calibration profile is determined for each of a plurality of different types of OSDs.

20. The device of claim 11, further configured to:
  collect point correspondences for one or both of: a threshold amount of time after the indication of correct alignment, or a threshold amount of time before the indication of correct alignment.

21. A machine readable non-transitory storage medium having stored therein program instructions that are executable by a processor to:
  guide a user to align a first virtual target on the OSD to a real-world target;
  collect, while guiding the user, a first plurality of real-world target poses, each real-world target pose having a first plurality of point correspondences to the OSD;
  receive an indication of a correct alignment between the first virtual target and the real-world target;
  guide the user to align a second virtual target on the OSD to the real-world target, the second virtual target having a different position than the first virtual target;
  collect, while guiding the user, a second plurality of real-world target poses, each real-world target pose having a second plurality of point correspondences to the OSD;
  receive an indication of a correct alignment between the second virtual target and the real-world target;
  iteratively refine an estimated eye position with respect to the OSD according to:
    a set of positioning parameters, and
    a set of point correspondences to the OSD selected from the first and second plurality of point correspondences to the OSD, wherein the iteratively refining includes a rigid geometric transformation between an image sensor and a position of an eye pupil; and
  provide, in response to refining the estimated eye position, an initial OSD calibration profile comprising the estimated eye position.

22. The medium of claim 21, wherein the iterative refinement is executed until an iteration threshold is met, the iteration threshold comprising one or more of: an error threshold, an iteration count, or a change in display diagonal value threshold.

23. The medium of claim 21, wherein the set of positioning parameters includes a width to height ratio of the OSD, an eye to camera distance along a user's eye optical axis, and an initial estimated eye position with respect to the OSD.

24. The medium of claim 21, further comprising instructions to:
  determine an eye intrinsic matrix from at least the estimated eye position and the set of positioning parameters from the initial calibration profile; and
  iteratively re-determine the eye intrinsic matrix by adjusting one or more of the set of positioning parameters until a second iteration threshold is met, wherein the second iteration threshold includes one or more of: an iteration counter, error threshold, or change in error threshold.

25. The medium of claim 21, wherein the set of point correspondences to the OSD are selected according to one or more of time or quality thresholds.

26. An apparatus for calibrating an optical see-through display, the apparatus comprising:
  means for guiding a user to align a first virtual target on the OSD to a real-world target;
  means for collecting, while guiding the user, a first plurality of real-world target poses, each real-world target pose having a first plurality of point correspondences to the OSD;
  means for receiving an indication of a correct alignment between the first virtual target and the real-world target;
  means for guiding the user to align a second virtual target on the OSD to the real-world target, the second virtual target having a different position than the first virtual target;
  means for collecting, while guiding the user, a second plurality of real-world target poses, each real-world target pose having a second plurality of point correspondences to the OSD;
  means for receiving an indication of a correct alignment between the second virtual target and the real-world target;
  means for iteratively refining an estimated eye position with respect to the OSD according to:
    a set of positioning parameters, and
    a set of point correspondences to the OSD selected from the first and second plurality of point correspondences to the OSD, wherein the means for iteratively refining includes means for utilizing a rigid geometric transformation between an image sensor and a position of an eye pupil; and
  means for providing, in response to refining the estimated eye position, an initial OSD calibration profile comprising the estimated eye position.

27. The apparatus of claim 26, wherein the set of point correspondences to the OSD are selected according to one or more of time or quality thresholds.

28. The apparatus of claim 26, wherein the iterative refining occurs until an iteration threshold is met, the iteration threshold comprising one or more of: an error threshold, an iteration count, or a change in display diagonal value threshold.

29. The apparatus of claim 26, wherein the set of positioning parameters includes a width to height ratio of the OSD, an eye to camera distance along a user's eye optical axis, and an initial estimated eye position with respect to the OSD, and wherein the second virtual target has a different scale and center point on the OSD than the first virtual target.

30. The apparatus of claim 26, further comprising:
  means for determining an eye intrinsic matrix from at least the estimated eye position and the set of positioning parameters from the initial calibration profile; and
  means for iteratively re-determining the eye intrinsic matrix by adjusting one or more of the set of positioning parameters until an iteration threshold is met, wherein the iteration threshold includes one or more of: an iteration counter, error threshold, or change in error threshold.

* * * * *